US005995116A

United States Patent [19]

Fujimura

[11] Patent Number: 5,995,116

[45] Date of Patent: Nov. 30, 1999

[54] HIGH DEFINITION GRAPHIC DISPLAY APPARATUS

[75] Inventor: Kazuya Fujimura, Shijounawateshi, Japan

[73] Assignee: Matsushita Electric Industrial Co., Ltd., Japan

[21] Appl. No.: 08/898,282

[22] Filed: Jul. 22, 1997

[30] Foreign Application Priority Data

Jul. 25, 1996 [JP] Japan .................................... 8-196655

[51] Int. Cl.[6] ...................................................... G06F 15/00

[52] U.S. Cl. .......................... 345/441; 345/202; 382/232; 382/245

[58] Field of Search .................................... 345/441, 420, 345/429, 425, 426, 430, 202, 509, 431; 382/232, 245

[56] References Cited

U.S. PATENT DOCUMENTS 5,278,949 1/1994 Thayer .................................... 395/126
5,455,900 10/1995 Shiraishi et al. ........................ 395/141

FOREIGN PATENT DOCUMENTS 6-266846 9/1994 Japan .

*Primary Examiner*—Mark K. Zimmerman
*Assistant Examiner*—Chante E. Harrison
*Attorney, Agent, or Firm*—Parkhurst & Wendell, L.L.P.

[57] ABSTRACT

A high definition graphic display apparatus comprises a polygon data inputting means for producing polygon data including coordinates to be displayed; an N times coordinate conversion means for expanding each coordinate value N times; an active list producing means for producing an active list which includes active cells each including information of an X coordinate which has N-times expanded coordinates which represent inclination of a side, and a number of Y coordinate lines which intersect the side, a scan list producing unit for producing a scan list by finding a line scan list of every scan line with a point on a side corresponding to the active cell which is present on the scan line; a scan line information extracting means for deciding whether an unit N lines is directly convertible into compressed display data, the unit N lines which includes a Y coordinate line; a compressed data producing means for producing compressed display data in accordance with an output of the scan line information extracting means; a compressed data expansion means for expanding the compressed display data to produce raster data; and a display device for displaying the expanded raster data.

4 Claims, 10 Drawing Sheets

HIGH DEFINITION GRAPHIC DISPLAY APPARATUS

FIELD OF THE INVENTION

The present invention relates to a graphic display apparatus which displays characters or graphics with high definition and, more particularly to a high definition graphic display apparatus which can perform data processing for displaying polygon data with high definition using fewer memories and at a high speed.

BACKGROUND OF THE INVENTION

A description is given of a prior art high definition graphic display apparatus with reference to FIGS. 7 to 10.

FIG. 7 is a block diagram illustrating the prior art high definition graphic display apparatus. In FIG. 7, a polygon data inputting unit 701 is for producing polygon data 711 comprising a coordinate of each vertex of a polygon to be displayed. An N times coordinate conversion unit 704 is for expanding each coordinate of the polygon data 711 N times to obtain N times polygon data 712. An active list producing unit 705 is for producing an active list 713 from the N times polygon data 712. A scan list producing unit 706 is for producing a scan list 714 from the active list 713. A rasterize unit 707 is for converting the scan list 714 into N times raster data 715. A 1/N time reducing unit 708 is for assuming N×N pixels in the N times raster data 715 as a cell and converting the N times raster data 715 into raster data 716 represented by an average which is obtained from averaging concentrations of the cell. A display device 709 is for displaying the input raster data 716. A polygon data expansion section 702 comprises the N times coordinate conversion unit 704, the active list producing unit 705, the scan list producing unit 706, the rasterize unit 707, and the 1/N time reducing unit 708. A display unit 703 comprises the display device 709.

FIG. 8(*a*) illustrates a polygon to be displayed. In the figure, reference numeral 800 designates the polygon to be displayed, reference numerals 801, 802, 803, 804, and 805 designate vertexes of the polygon 800, respectively and reference numerals 811, 812, 813, 814, and 815 designate sides of the polygon 800, respectively.

FIG. 8(*b*) illustrates a polygon which is expanded N times by the N times coordinate conversion unit 704. In the figure, reference numeral 8000 designates a polygon which is expanded N times, reference numerals 8010, 8020, 8030, 8040, and 8050 designate vertexes of the polygon 8000, respectively and reference numerals 8110, 8120, 8130, 8140, and 8150 designate sides of the polygon 8000, respectively.

A description is given of an operation of the prior art high definition graphic apparatus.

The polygon data inputting unit 701 produces polygon data 711 comprising coordinates of vertexes 801 to 805 of the polygon 800 to be displayed.

The N times coordinate conversion unit 704 expands respective coordinate values of vertexes of the polygon 800 which are written onto the polygon data 711 which is produced by the polygon data inputting unit 701, to produce N times polygon data 712. At this time, when the expansion ratio N used in the N times coordinate conversion unit 704 is set to be 4, every value of the vertex of the polygon data 711 is expanded 4 times and converted into N times (4 times) polygon data 712 comprising sides (8110, 8120, 8130, 8140, 8150) shown in FIG. 8(*b*).

FIG. 9 illustrates the active list 713 which is produced by the active list producing unit 705. In FIG. 9, reference numeral 901 designates a header of an active list, reference numeral 902 designates a header of a line active list of a Y coordinate line Y=0, reference numeral 903 designates a header of a line active list of a Y coordinate line Y=32, and reference numerals 911, 912, 921, 922, and 923 designate active cells corresponding to sides of the polygon, 8110, 8120, 8130, 8140, and 8150. The active list producing unit 705 scans Y coordinate lines of the polygon 8000 of the 4 times polygon data 712 in the order of ascending numerals from Y=0 and sequentially produces a line active list for a Y coordinate line which is an origin of a side of the polygon. For instance, when N times polygon data of the polygon 8000 is input, since there are sides 8110, and 8150, whose tops are present on X coordinate 12 on Y coordinate line Y=0, the active list producing unit 705 produces a header 902 of a line active list indicating Y=0, and then produces the line active list which describes active cells 911 and 912 comprising parameters such as an X coordinate which belongs to the top of the side, a number of Y coordinate lines which intersect the side, and inclination of the side. In addition, since there are sides 8120 and 8130 whose tops are present on X coordinate 16 on Y coordinate line Y=32 and a side 8140 whose top is present on X coordinate 36, the active list producing unit 705 produces a header 903 of a line active list indicating a line Y=32, and then produces the line active list which describes active cells 921, 922, and 923 corresponding to these sides. An active list 713 represented by the header of the active list and the following line active list for each Y coordinate line thus obtained are produced by the active list producing unit 705. As illustrated by a side 8150, when there is another side (in this case 8140) which is continuous with the side 8150 in the ascending order of Y coordinate, the number of Y coordinate lines of an active cell 912 corresponding to the side 8150 which intersect the side 8150 is smaller than a number which is computed using vertex coordinate by 1.

FIGS. 10(*a*) and 10(*b*) illustrate line scan lists which are produced by the scan list producing unit 706. FIG. 10(*a*) illustrates a line scan list of the scan line represented by SL1 in FIG. 8(*b*). FIG. 10(*b*) illustrates a line scan list of the scan line represented by SL2 in FIG. 8(*b*). In the figures, reference numeral 1011 designates a header of a line scan list of the scan line SL1, reference numeral 1012 designates an active cell indicating a first point on a side of the polygon from left on the scan line SL1, reference numeral 1013 designates an active cell indicating a second point on a side of the polygon from left on the scan line SL1, reference numeral 1021 designates a header of a line scan list on a scan line SL2, reference numeral 1022 designates an active cell indicating a first point on a side of the polygon from left on the scan line SL2, reference numeral 1023 designates an active cell indicating a second point on a side of the polygon from left on the scan line SL2, reference numeral 1024 designates an active cell indicating a third point on a side of the polygon from left on the scan line SL2, and reference numeral 1025 designates an active cell indicating a fourth point on a side of the polygon from left on the scan line SL2.

When a point on a side corresponding to an active cell is present on a scan line (Y=0), the scan list producing unit 706 sequentially produces a line scan list comprising an active cell indicating the point arranged in right direction (in the direction of ascending X from left end of the scan line) (X=0). On completion of production of a line scan list of the scan line Y=0, after subtracting 1 from a number of lines of the active cell which is added to the line scan list, the scan list producing unit 706 produces a line scan list of a scan line Y=1, and sequentially produces a line scan list for every scan line. In this way, the scan list producing unit 706 finds the line scan list in which a point on the side corresponding to each active cell that is present on the scan line for each scan line using the active list 713, for every scan line, to produce the scan list 714.

The rasterize unit 707 paints an interval from an odd numbered point on a side of the polygon from left to an even numbered point on a side of the polygon which are included in the scan list, for every scan line, thereby producing N times raster data 715 which is painted on the basis of an even odd rule.

Thereafter, in 1/N reducing processing in which a region including N×N (in this case 4×4) pixels of obtained N times raster data 715 is assumed as a cell to be output, the 1/N times reducing unit 708 produces raster data 716 which is obtained by representing a concentration of each 1/N reduced cell using values of 17 ranks, i.e., 0 to 16 which are represented by a number of painted pixels of all pixels (4×4=16 pixels) included in the cell. Thus obtained raster data 716 is input to a display device to display the polygon therein.

Thus, in the prior art high definition graphic display apparatus, after N times expansion of the polygon data, N times raster data is produced, and in 1/N reducing processing of the N times raster data, the raster data is produced, with the concentration of each cell represented by numbers of (N×N+1) ranks. Therefore, it is possible to make jagged edges of the displayed polygon unobvious. As a result, it is possible to display characters or graphics with high definition.

In the prior art high definition graphic display apparatus, when N times raster data is produced and 1/N times reducing processing of the N times raster data is performed, the raster data with the concentration of each cell represented by the number of (N×N+1) ranks is produced, thereby high definition graphic display can be performed. Therefore, it is necessary to expand the polygon data N times to produce the N times raster data, and many memories are required to produce the N times raster data.

In addition, it is time-consuming to produce N times raster data and perform operation processing for representing every cell concentration using a number of (N×N+1) ranks in 1/N reducing processing.

Further, in the case of applying the prior art high definition graphic display apparatus to an animation reproduction apparatus, since data to be transmitted to a display unit is raster data, transmission data and memories for recording (storing) the data becomes enormous.

SUMMARY OF THE INVENTION

It is an object of the present invention to provide a high definition graphic display apparatus wherein processing for high definition graphic display is performed without producing N times raster data, thereby processing can be performed with fewer memories and at a high speed and, simultaneously the amount of data which is transmitted to a display means can be reduced significantly.

Other objects and advantages of the present invention will become apparent from the detailed description given hereinafter. It should be understood, however, that the detailed description and specific embodiment are given by way of illustration only, since various changes and modifications within the scope of the invention will become apparent to those skilled in the art from this detailed description.

According to a first aspect of the present invention, a high definition graphic display apparatus comprises a polygon data inputting unit for producing polygon data which includes coordinates of vertexes of a polygon to be displayed; an N times coordinate conversion unit for expanding each coordinate value of the polygon data N times and outputting N times polygon data; an active list producing unit for producing an active list which includes a plurality of active cells each including information of an X coordinate which belongs to a top of a side of a polygon which has N-times expanded coordinate values and is represented by the N times polygon data, inclination of the side, and a number of Y coordinate lines which intersect the side, for each Y coordinate line positioned at top end of the side; a scan list producing unit for producing a scan list by finding a line scan list for every scan line with a point on a side corresponding to the active cell which is present on the scan line sequentially arranged in a direction of the scan line, for each scan line as a Y coordinate scan line using the active list; a scan line information extracting unit for deciding whether an unit N lines is directly convertible into compressed display data or not, the unit N lines which includes a Y coordinate line including N lines of a plurality of line scan lists included in the scan list, in the process of producing the active list; a compressed data producing unit for producing compressed display data in accordance with an output of the scan line information extracting unit for each unit N lines; a compressed data expansion unit for expanding the compressed display data to produce raster data; and a display device for displaying the expanded raster data. Therefore, it is possible to display high definition graphics with anti-aliasing with no necessity of producing every N times raster data, resulting in significant improvement of efficiency in memories and processing speed.

According to a second aspect of the present invention, in the high definition graphic display apparatus according to the first aspect, the scan list producing unit produces the line scan list from the active list for each line scan list and sequentially outputs the line scan list, and the compressed data producing unit produces the compressed display data for each N lines of the sequentially output line scan lists. Therefore, a size of a memory for N lines will do and efficiency in memories is improved.

According to a third aspect of the present invention, in the high definition graphic display apparatus according to the first aspect, the compressed data producing unit, for the unit N lines of the line scan lists which are directly convertible by run-length compression, produces run-length data in which a concentration of each cell on the unit N lines is described on the basis of a specification of the run-length compression and which includes N×N coordinates on the unit N lines, from line scan lists of the unit N lines, and for the unit N lines of the line scan lists which are directly inconvertible by run-length compression, produces raster data in the concentration of each cell on the unit N lines which includes N×N coordinates on the unit N lines from line scan lists of the unit N lines, and convert the raster data into run-length data on the basis of the specification of the run-length compression to produce run-length data of the unit N lines. Therefore, it is possible to convert directly convertible line scan lists of N lines into compressed data by simple mathematical coordinate calculation and at a high speed.

According to a fourth aspect of the present invention, in the high definition graphic display apparatus according to the first aspect, the scan line information extracting unit decides whether the line scan lists of the unit N lines are directly convertible into compressed display data or not using one of a maximum point and a minimum point in Y direction of the polygon. Therefore, processing for deciding whether the line scan lists can be directly converted into compressed display data or not is simplified.

According to a fifth aspect of the present invention, in the high definition graphic display apparatus according to the first aspect, the line scan lists includes painted intervals, each of the painted intervals is represented by an X coordinate of a start point and an X coordinate of an end point of each painted interval. Therefore, a number of memories is further reduced and processing speed is increased.

According to a sixth aspect of the present invention, in the high definition graphic display apparatus according to the first aspect, the N times coordinate conversion unit expands 4 times. Therefore, it is possible to display high definition graphics with a size of a memory reduced.

According to a seventh aspect of the present invention, in the high definition graphic display apparatus according to the first aspect, plural pieces of the produced compressed display data is stored in the compressed data storage unit and the plural pieces of the compressed data is sequentially input to the compressed data expansion unit to be sequentially displayed by the display device. Therefore, compressed data is input to the display unit, so that the apparatus is applied to cheap animation reproducing apparatus by storing compressed data in a hard disk for one frame without pressing storage region of the compressed data storage unit, resulting in significant practicality.

DETAILED DESCRIPTION OF PREFERRED EMBODIMENTS

A description is given of a high definition graphic display apparatus according to a first embodiment with reference to figures.

Figure 1:
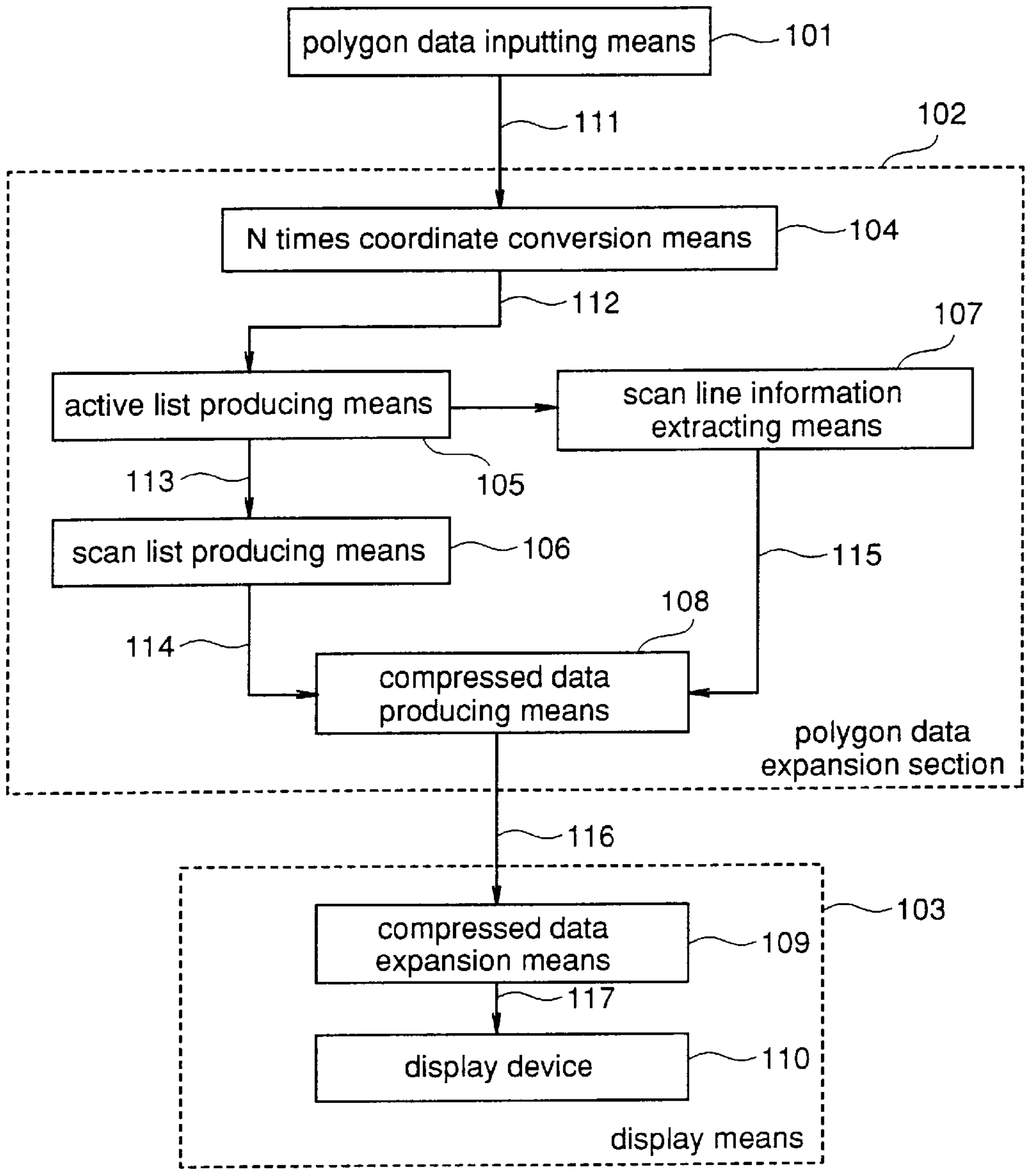
FIG. 1 is a block diagram illustrating a high definition graphic display apparatus according to a first embodiment.

FIG. 1 is a block diagram illustrating the high definition graphic display apparatus according to the first embodiment of the present invention. The high definition graphic display apparatus in accordance with the first embodiment comprises a polygon data inputting unit 101, a polygon data expansion section 102, and a display unit 103. The polygon data inputting unit 101 is for producing polygon data 111 comprising coordinates of respective vertexes of a polygon to be displayed. The polygon data expansion section 102 comprises an N times coordinate conversion unit 104, an active list producing unit 105, a scan list producing unit 106, a scan line information extracting unit 107, and a compressed data producing unit 108. The N times coordinate conversion unit 104 is for expanding the polygon data 111 N times to produce N times polygon data 112. The active list producing unit 105 is for producing an active list 113 from the N times polygon data 112. The scan list producing unit 106 is for producing a scan list 114 from the active list 113. The scan line information extracting unit 107 is for extracting Y coordinate line information as a scan line in the process of producing the active list. The compressed data producing unit 108 is for producing compressed data 116 from the scan list 114. The display unit 103 comprises a compressed data expansion unit 109 and a display device 110 The compressed data expansion unit 109 is for expanding the compressed data 116 into raster data.

Figure 4:
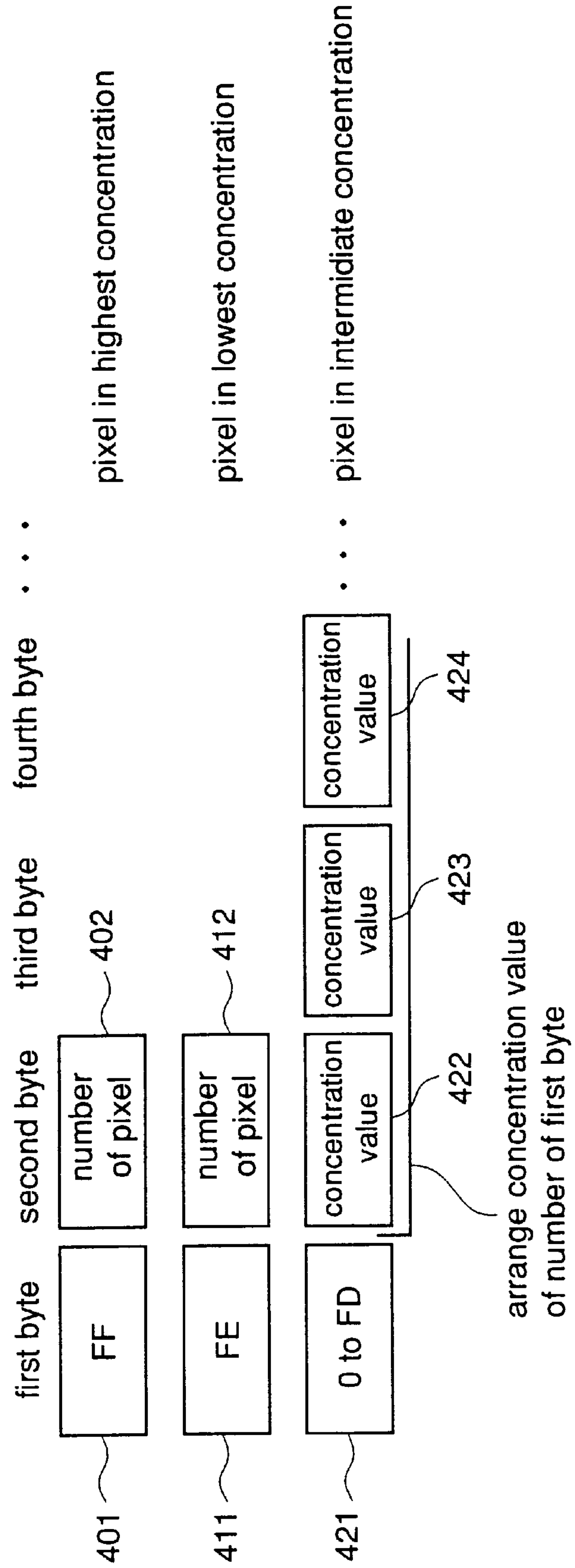
FIG. 4 is a diagram illustrating specification of in the first embodiment of the first embodiment.

FIG. 4 is a diagram for explaining specification of run-length data in the first embodiment. In FIG. 4, reference numeral 401 designates a first byte of run-length data of a pixel in a highest concentration, 402 designates a second byte of run-length data of a pixel in the highest concentration, 411 designates a first byte of run-length data of a pixel in a lowest concentration, 412 designates a second byte of run-length data of a pixel in the lowest concentration, 421 designates a first byte of run-length data of a pixel in an intermediate concentration, 422 designates a second byte of a run-length data of a pixel in the intermediate concentration, 423 designates a third byte of run-length data of a pixel in the intermediate concentration, and 424 designates a fourth byte of run-length data of a pixel in the intermediate concentration.

Figure 5:
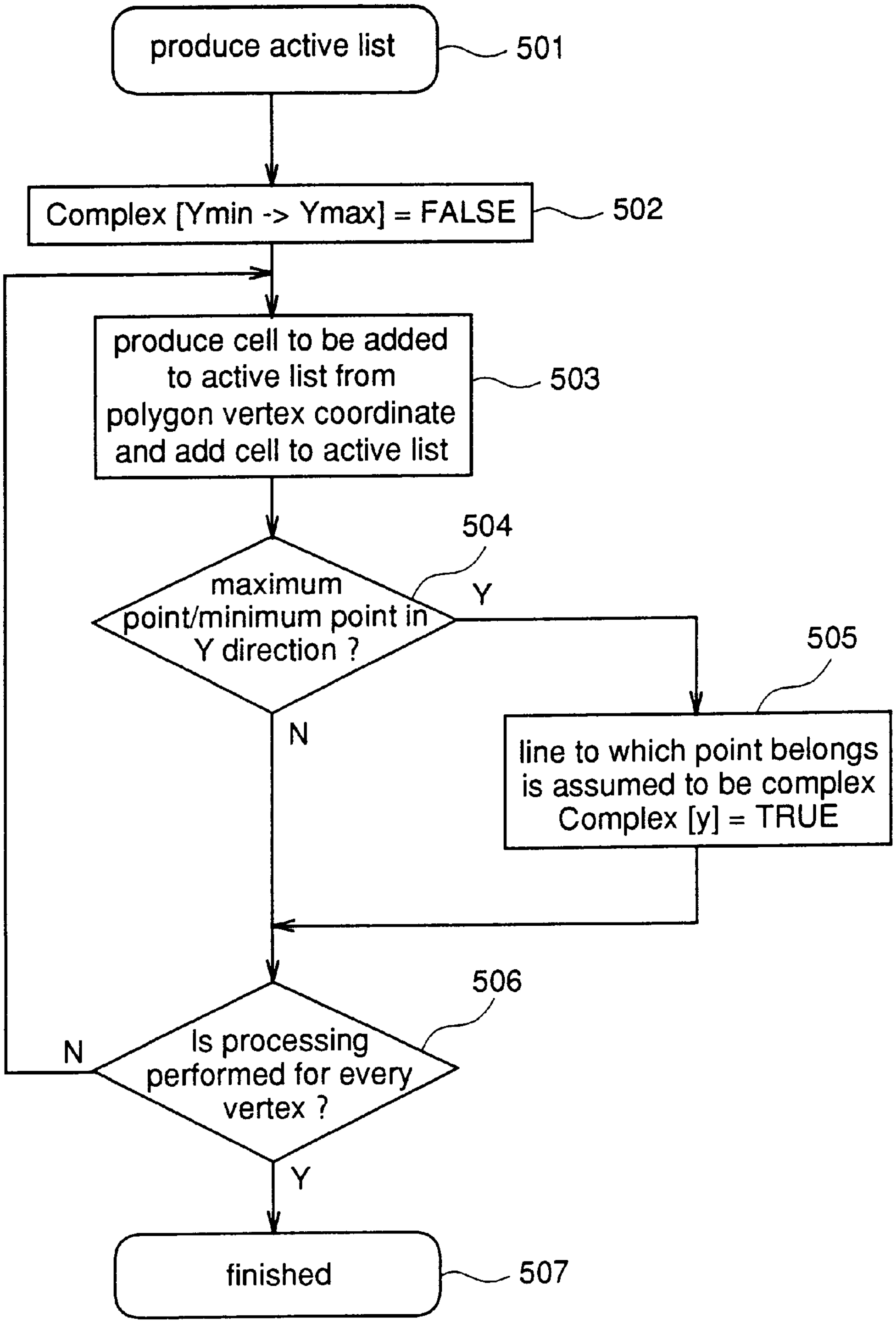
FIG. 5 is a flowchart of data processing performed by an active list producing list producing unit and by scan line information extracting unit in the first embodiment of the present invention.
Figure 6:
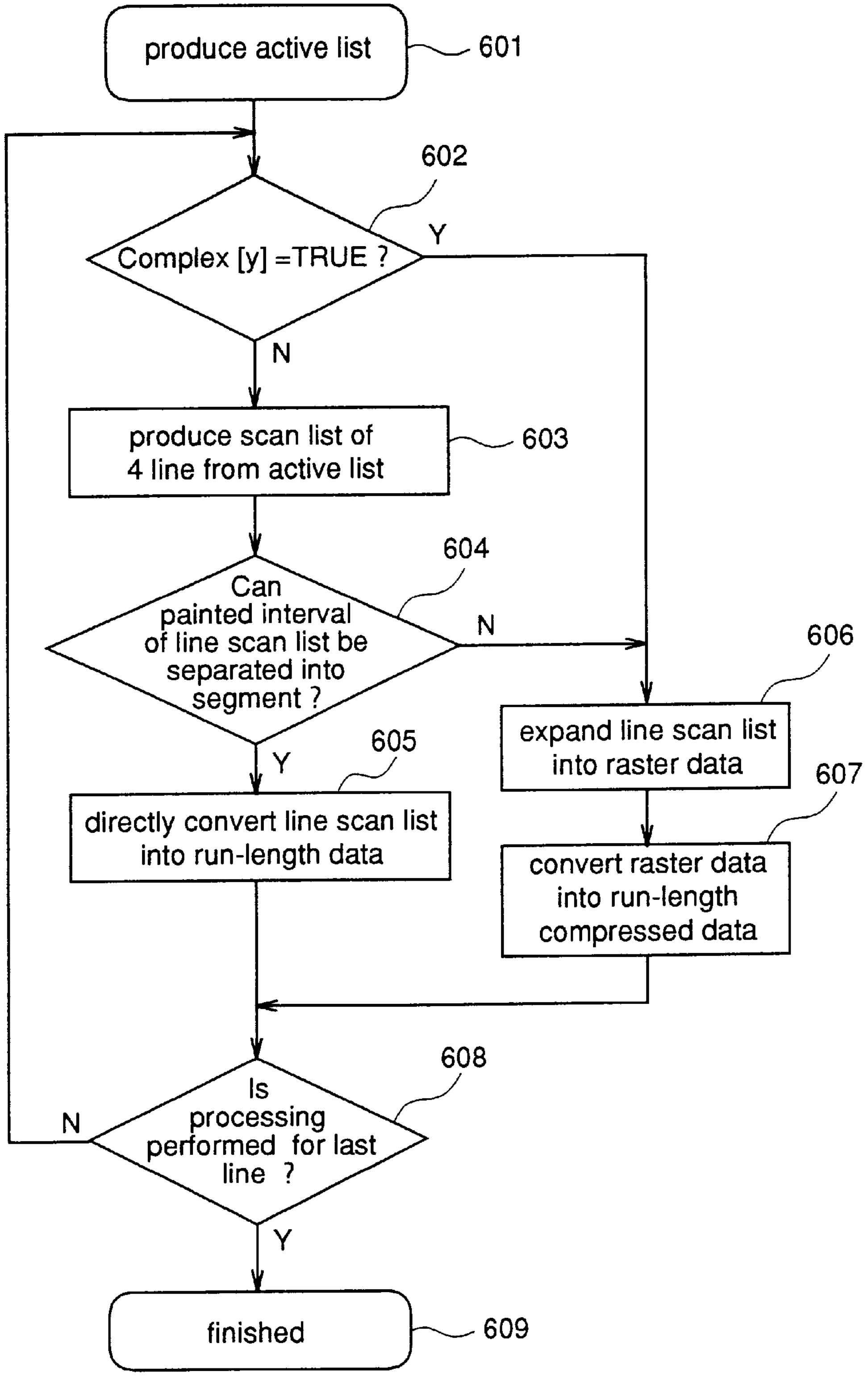
FIG. 6 is a flowchart of data processing before production of compressed data after production of active lists in the first embodiment of the present invention.
Figure 7:
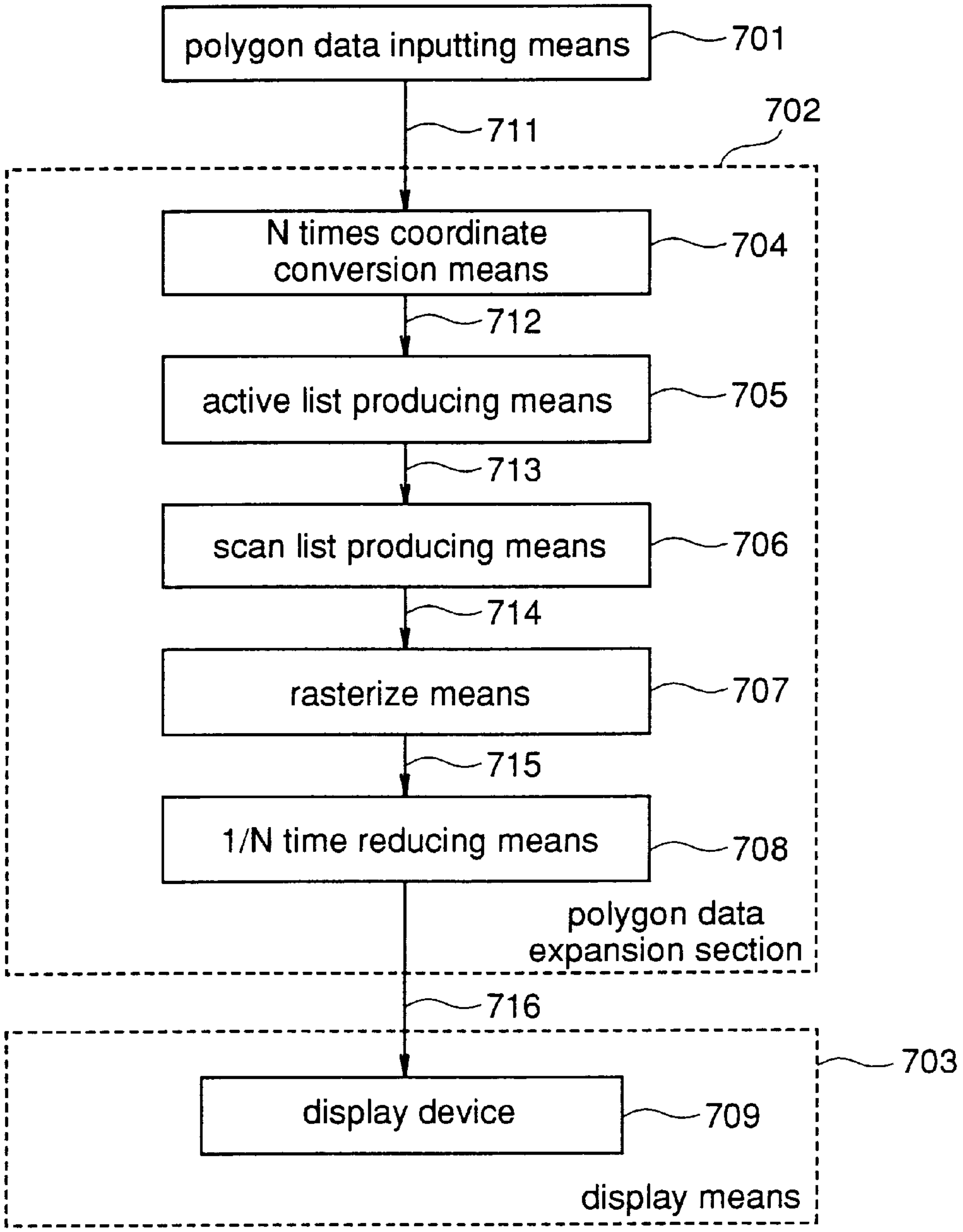
Fig.7 Prior Art
FIG. 7 is a block diagram illustrating a prior art high definition graphic display apparatus.

FIG. 5 illustrates a flowchart of data processing using the active list producing unit 105 and the scan line information extracting unit 107. FIG. 6 illustrates a flowchart of data processing before production of compressed data, after production of the active list.

A description is given of an operation of the high definition graphic display apparatus according to the first embodiment with reference to FIG. 1.

The high definition graphic display apparatus according to the first embodiment directly produces compressed data 116 for each N lines of the scan list 114 which is produced from the active list 113. For lines in which compressed data cannot be produced directly, after converting line scan lists of N lines into raster data, the raster data is converted into compressed data 116, and then the compressed data 116 is converted into raster data 117 in the compressed data expansion unit 109 of the display unit 103, to be displayed therein.

The polygon data inputting unit 101 produces polygon data 111 comprising coordinates of respective vertexes 801 to 805 of a polygon 800 to be displayed.

Figure 8:
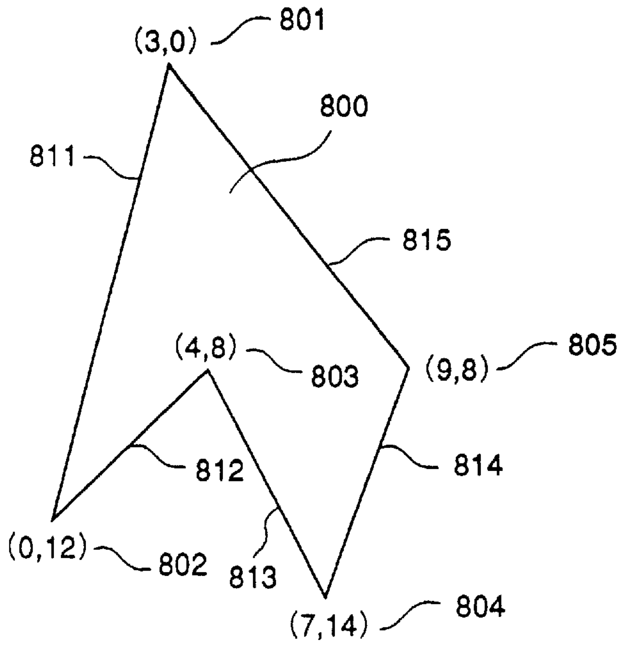
FIG. 8(*a*) is a diagram illustrating a polygon to be displayed in a high definition graphic display apparatus and FIG. 8(*b*) is a diagram illustrating a polygon expanded 4 times after inputting the polygon.
Figure 8:
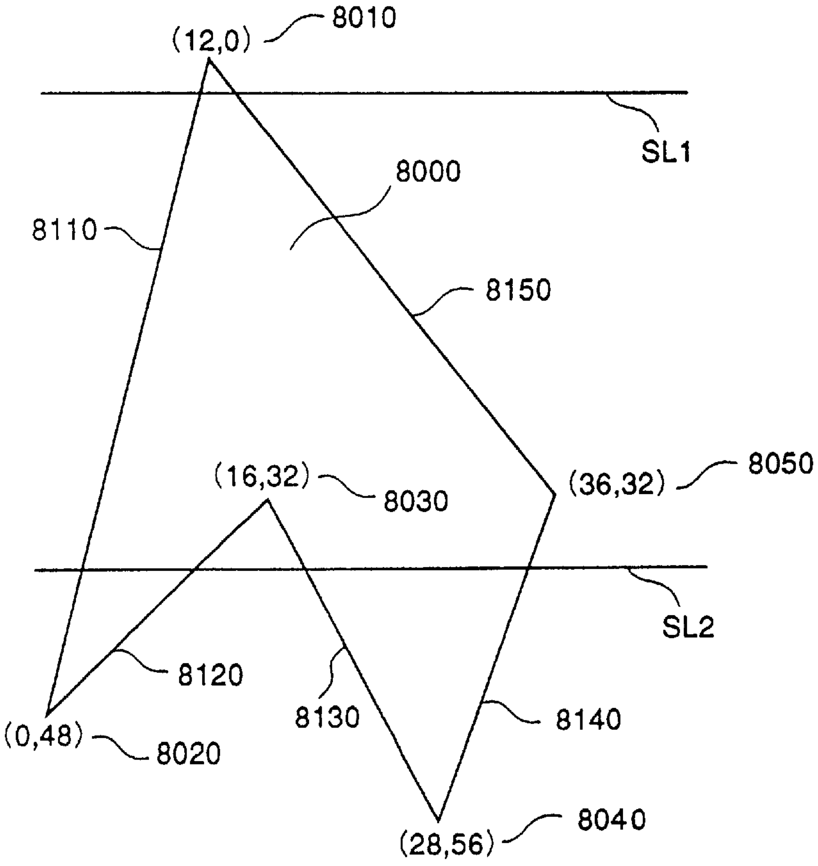
Figure 9:
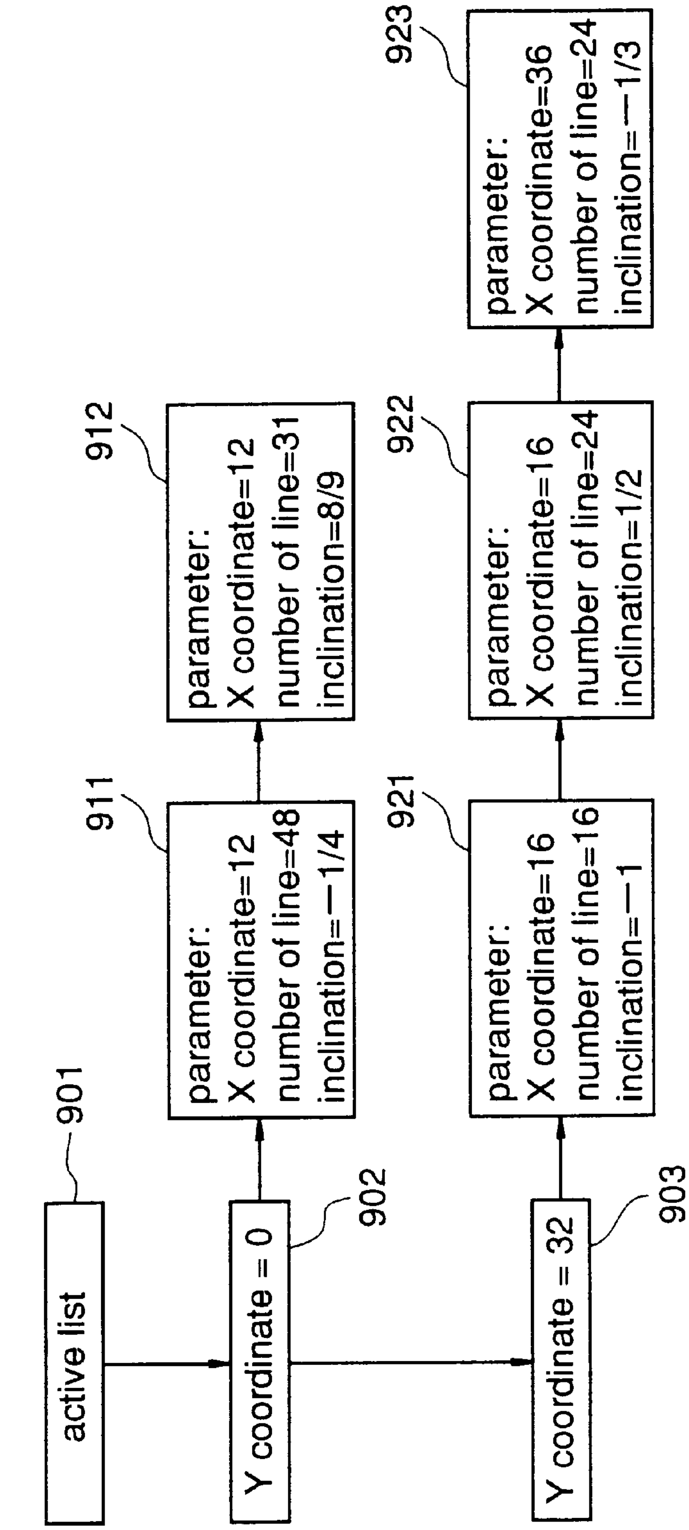
FIG. 9 is a diagram for explaining an active list of a high definition display apparatus.
Figure 10:
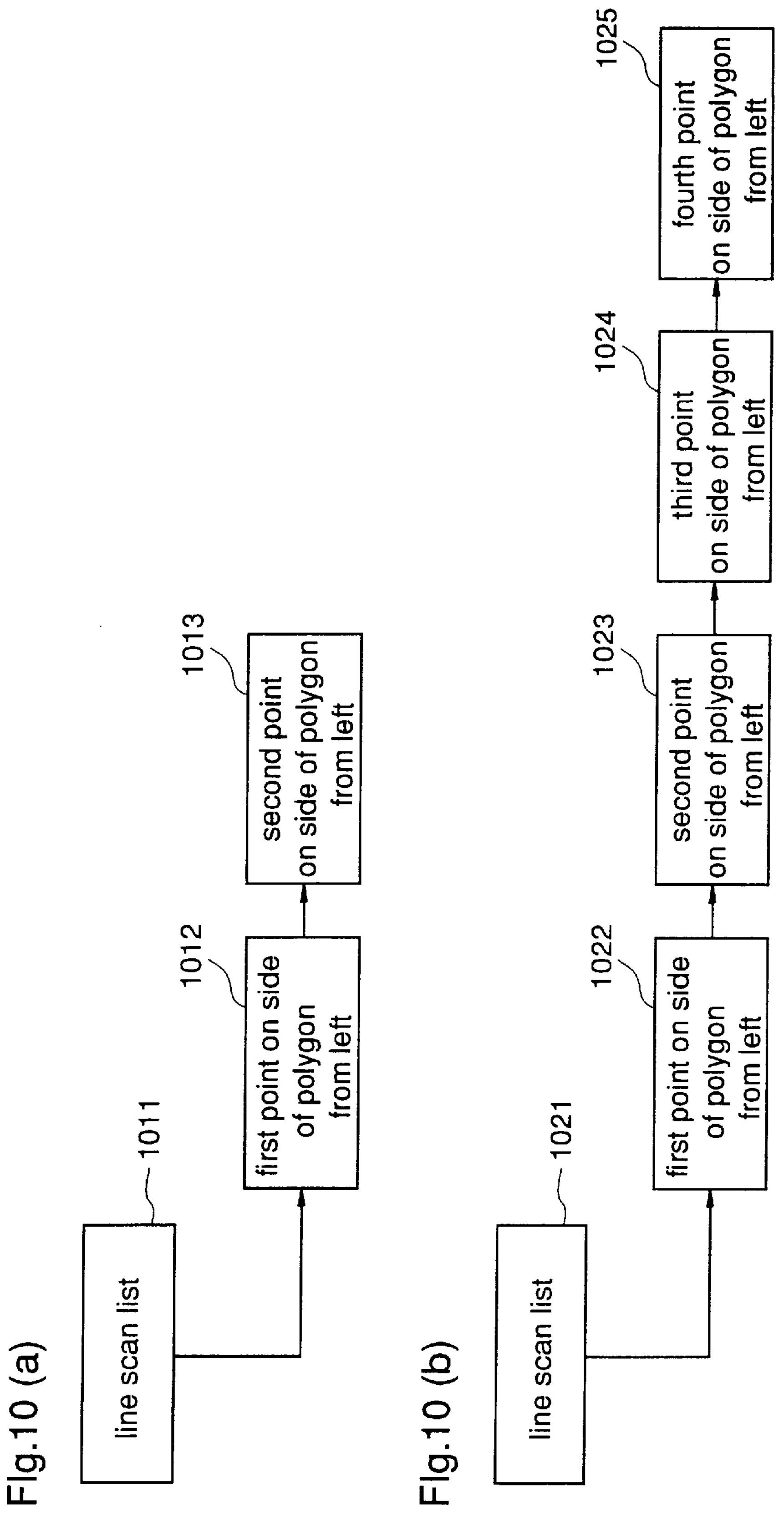
FIGS. 10(*a*) and 10(*b*) are diagrams for explaining a scan list of the high graphic display apparatus.

The N times coordinate conversion unit 104 expands respective values of vertexes of the polygon 800 written onto the polygon data 111 which is produced by the polygon data inputting unit 101 N times to produce N times polygon data 112. Setting expansion ratio N in the N times coordinate to be 4, the values of the vertexes of the polygon data 111 are respectively expanded 4 times and converted into N times (4 times) polygon data 112 including vertex coordinates (8110, 8120, 8130, 8140, 8150) illustrated in FIG. 8(*b*).

The active list producing unit 105 scans Y coordinate lines in the order of ascending Y values, starting from line Y=0 of the polygon 8000 corresponding to the 4 times polygon data 112. For a side of the polygon which originates in a Y coordinate line, the active list producing unit 105 produces a line active list for the Y coordinate lines At this time, when N times polygon data of the polygon 8000 is input, the active list producing unit 705 produces a header 902 of a line active list indicating Y=0, and then produces the line active list which describes active cells 911 and 912 corresponding to sides 8110 and 8150, respectively. In addition, the active list producing unit 705 produces a header 903 of a line active list indicating a line Y=32, and then produces the line active list which describes active cells 921, 922, and 923 corresponding to sides 8120, 8130, and 8140, respectively.

The high definition graphic display apparatus of the first embodiment directly produces run-length data from line scan lists of N lines of the scan list 114 in a compressed data producing unit 108 mentioned later. To make an effective decision on whether it is possible to directly produce this run-length data or not, there is provided a scan line information extracting unit 107, by which it is possible to make a decision on whether there is a point of a polygon which indicates a maximum/minimum value on a Y coordinate line.

FIG. 5 illustrates a flow of data processing using the active list producing unit 105 and the scan line information extracting unit 107. A description is given of the data processing using the active list producing unit 105 and the scan line information extracting unit 107 with reference to these figures.

In FIG. 5, in step 501, active lists are produced by the active list producing unit 105. In step 502, flags of all lines on which the polygon is present are set to be FALSE. In step 503, N times polygon data including vertex coordinates which is input to the active list producing unit 105 is converted into an active cell to be added to the active list, to produce an active list. In step 504, it is decided whether there is a point of the polygon which indicates a maximum/minimum value in Y direction or not by the scan line information extracting unit 107 in the process of producing the active line list. In step 505, for a Y coordinate line on which there is a maximum/minimum value in Y direction, a flag on the Y coordinate line is set to be TRUE. In step 506, it is decided whether processing of polygon vertexes is completed. When it is decided that the processing is not completed, returning to the step 503, and when it is decided that the processing is completed, in step 507, production of active lists and production of the scan line information 115 are completed. Using the scan line information 115, a Y coordinate line including a maximum/minimum value in Y direction can be predecided with no necessity of producing scan lists.

Thereafter, thus produced active list 113 is processed following a flow of data processing shown in FIG. 6. A description is given of data processing following the flow in FIG. 6.

As described with reference to FIG. 5, in the process of producing the active list (in step 601), the flag on each Y coordinate line is FALSE or TRUE. The compressed data producing unit 108 refers to the flag and when the flag is TRUE, line scan lists of an unit N lines (4 lines) including the Y coordinate line are expanded into raster data in step 606 mentioned later. On the other hand, when the flag is not TRUE, line scan lists of an unit N lines including the Y coordinate line are processed in step 603.

In step 603, if there is a point on a side corresponding to the active cell on the Y coordinate line, sequentially from Y coordinate line Y=0, the scan list producing unit 106 produces a line scan list with X coordinate of the point on the side corresponding to the active cell arranged sequentially in right direction (in the order of ascending X coordinate) from left end of the scan line (X=0) and outputs the line scan line list for each unit N lines. In step 604, for thus obtained line scan lists for each unit N lines, it is decided whether intervals thereof to be painted are completely separated into several parts or not, that is, whether it is possible to directly convert the line scan lists into run-length data or not, by the compressed data producing unit 108. When it is decided that it is possible, in step 605, they are directly converted into run-length data and when it is decided that it is not possible, in step 606 mentioned later, they are expanded into raster data.

Figure 3:
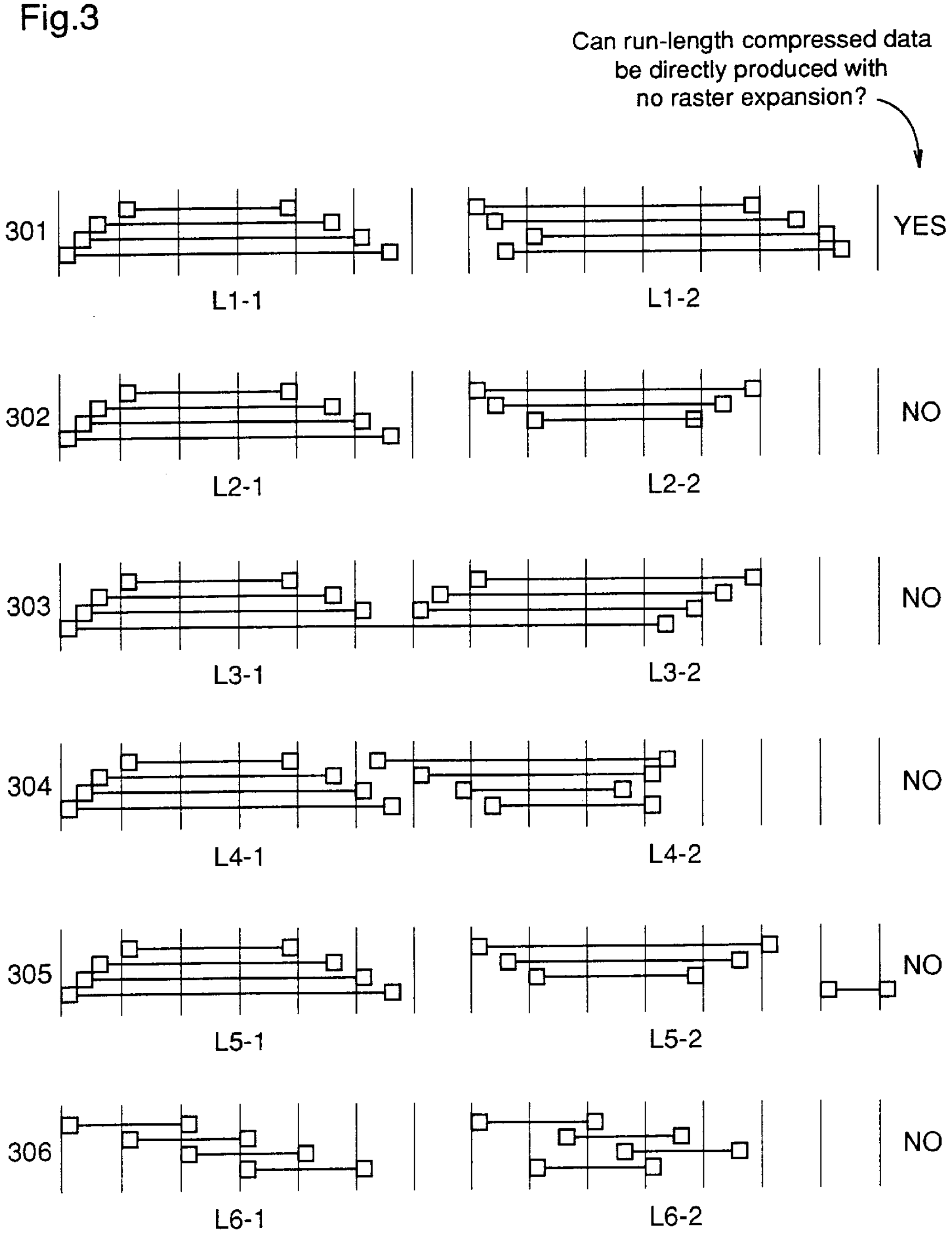
FIG. 3 is a diagram for explaining data which can produce directly from line scan lists and data which cannot in the first embodiment of the present invention.

A description is given of two examples, i.e., one case in which it is possible to directly convert line scan lists into run-length data for each unit N lines and the other case in which it is not, and simultaneously a decision method thereof. FIG. 3 illustrates data in which it is possible to directly produce run-length data with no raster expansion from line scan lists and data in which it is not possible. Illustrations 301 to 306 have their respective intervals to be painted (painted interval) of four lines as an unit N lines, and have painted patterns Li-1, Li-2 (i=1–6) which are adjacent to each other and positioned right and left.

An illustration 301 shows that a right end of each painted interval constituting a painted pattern L1-1 on the left is not overlapped with a left end of each painted interval constituting a painted pattern L1-2 and the painted pattern L1-1 is completely separated from the L1-2, so that it is possible to perform direct data conversion using run-length compression. It is possible to decide whether these two painted patterns (L1-1, L1-2) overlap or not by comparing a maximum value of an end of a painted interval constituting the painted pattern L1-1 and a minimum value of an end of a painted interval constituting the painted pattern L1-2.

In illustration 302, a painted pattern L2-2 on the right is not constituted of four independent painted intervals, so that it is impossible to directly convert it into run-length data. It is possible to decide whether the painted pattern is constituted of four independent painted intervals or not by detecting whether a vertex of the polygon includes a maximum or minimum value in Y direction.

In 303, there is a continuous painted interval between a painted pattern L3-1 on the left and a painted pattern L3-2 on the right, so that it is impossible to directly convert it into run-length data. It is possible to decide whether painted intervals of four lines are continuous with each other or not by detecting whether there is a change of number of painted intervals among four lines or not.

In 304, a right end of a painted interval constituting a painted pattern L4-1 on the left is on the right side of a left end of a painted interval constituting a painted pattern L4-2 on the right, so that it is impossible to directly convert it into run-length data. It is possible to decide whether two painted patterns (L4-1, L4-2) overlap or not by comparing a maximum value of an end point of a painted interval constituting the painted pattern L4-1 with a minimum value of an end point of the painted pattern L4-2 on the right.

In 305, though there are painted intervals of four lines, one of four painted intervals constituting a painted pattern L5-2 on the right is on an X coordinate, spaced apart from the other painted intervals, so that it is impossible to directly convert it into run-length data. This is decided by comparing a maximum value of a start point with a minimum value of an end point among four painted intervals which constitute the painted pattern L5-2.

In 306, though there are painted intervals of four lines as in the case of 305, at least one of painted intervals constituting a painted pattern (L6-1 or L6-2) is on an X coordinate, spaced apart from the other painted intervals, so that it is impossible to directly convert it into run-length data As in the case of 305, this is decided by comparing a maximum value of a start point with a minimum value of an end point among four painted intervals which constitute the painted pattern.

As described above, in step 604, it is decided whether it is possible to directly convert line scan lists into run-length data for each unit N lines or not. However, in step 602, it has been decided that it is impossible to directly convert the unit N lines including the maximum/minimum value in Y direction as shown in 302, into run-length data. Therefore, in step 604, whether the unit N lines include the maximum/minimum value in Y direction or not is omitted and step 604 is not performed for the unit N lines including the maximum/minimum value in Y direction, so that decision step for deciding whether it is possible to directly convert it into run-length data or not is simplified.

Figure 2:
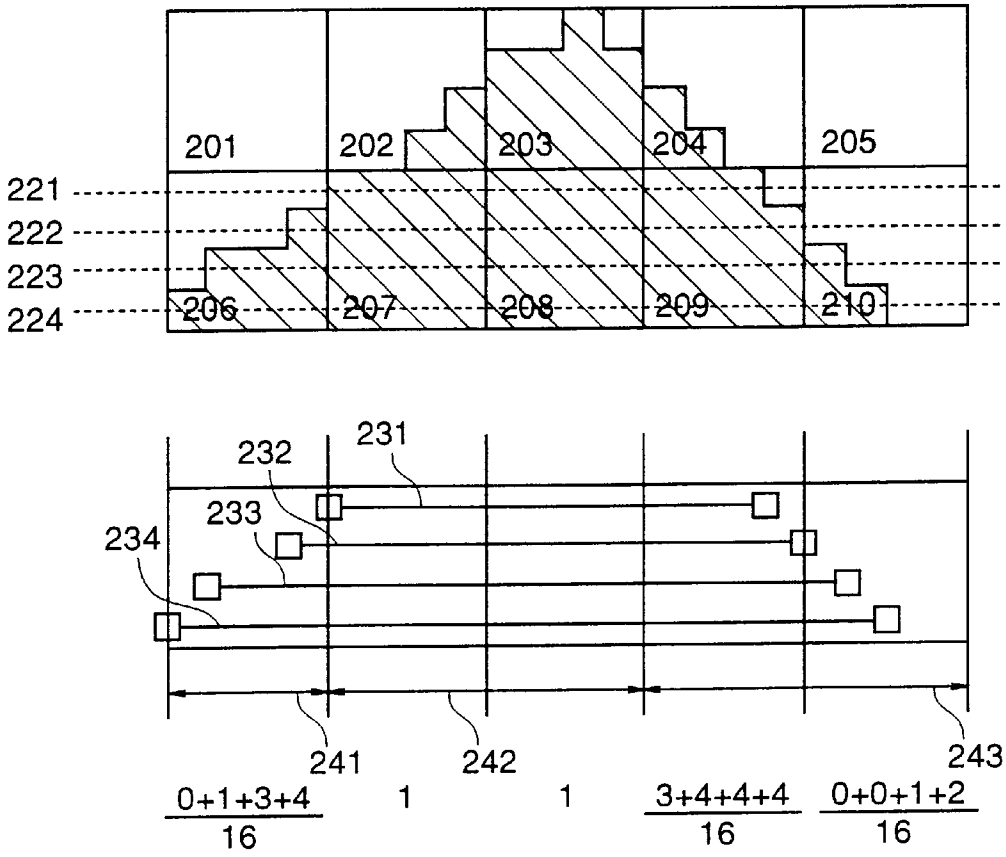
FIG. 2 is a diagram for explaining production of compressed data in a compressed data producing unit according to a first embodiment of the present invention.

A description is given of data processing in step 605 of the unit N lines in which line scan lists can be directly converted into run-length data with reference to FIGS. 2 and 4. FIG. 2 illustrates production of compressed date in step 605. In FIG. 2, reference numerals 201 to 210 designate cells each including 4×4 (N×N) coordinates corresponding to pixels prior to 4 times (N times) coordinate-conversion, respectively. Reference numerals 221 to 224 designate scan lines, respectively. Reference numeral 231 designates a painted interval for the scan line 221, 232 designates a painted interval for the scan line 222, 233 designates a painted pattern for the scan line 223, 234 designates a painted interval for the scan line 224, and 241 to 243 designate intervals.

For the unit N lines in which it is possible to directly convert line scan lists into run-length data, the compressed data producing unit 108 calculates 4 painted intervals 231 to 234 corresponding to 4 scan lines 221 to 224, respectively, from 4 line scan lists of four scan lines 221 to 224, calculates a minimum value (smallest X coordinate) and a maximum value (largest X coordinate) among the four start points of the four painted intervals 231 to 234, and calculates an interval including a cell represented by intermediate concentration of a start point using the X coordinate. That is, the compressed data producing unit 108 calculates an interval (in this case an interval 241) including a cell which is present between the smallest X coordinate and the largest X coordinate among start points of the four painted intervals 231 to 234. In addition, the compressed data producing unit 108 calculates a maximum value and a minimum value among four end points of the four painted intervals 231 to 234 and calculates an interval including a cell represented by intermediate concentration of an end point using the x coordinate. That is, the compressed data producing unit 108 calculates an interval including a cell which is present between smallest X coordinate and largest X coordinate (in this case an interval 243) among end points of painted intervals 231 to 234.

Then, the compressed data producing unit 108 calculates concentration of each cell (in this case one cell) to be painted in an intermediate concentration included in the interval 241 from coordinate values of start points of the painted intervals 231 to 234, and calculates a concentration of each cell (in this case two cells) to be painted in an intermediate concentration included in the interval 243 from the coordinate values of end points of the painted intervals 231 to 234. A calculation for finding a concentration of each cell included in the intervals 241 and 243 is performed using a calculation formula by which a number of pixels to be painted corresponding to each painted interval in the cell is found in N×N (4×4) pixels included in the cell as shown below intervals in FIG. 2. When the interval 241 is not overlapped with the interval 243, the interval 242 between the intervals 241 and 243 is to be painted in the highest concentration.

Thus, the obtained concentration of each cell is produced on the basis of specification of the compressed data 115 illustrated in FIG. 4. The specification is as follows. The cells to be painted in the highest concentration are represented by FF indicating the highest concentration, and then a number of continuous cells (pixels) to be painted in the highest concentration. The cells to be painted in the lowest concentration are represented by FE indicating the lowest concentration and then a number of continuous cells to be painted in the lowest concentration. The cells to be painted in the intermediate concentration are represented by a number of continuous cells to be painted in the intermediate concentration and their concentration values of the number of cells. If ten cells from 201 to 210 shown in FIG. 2 are represented on the basis of this specification and on the basis of a specification of the run-length data, resulting in its compressed data, such as FE, 01, 03, 03, 0D, 03, FE, 01, 01, 08, FF, 02, 02, 0F, 03.

In step 606, line scan lists of an unit N lines which are not to be directly converted into run-length data are raster-expanded into a memory space of one row using a raster buffer of one row capacity, a region including N×N (in this case 4×4) pixels of resulting N times raster data is assumed to be one cell, and raster data in which concentration of each cell is represented by a number of painted pixels of pixels included in the cell (4×4=16 pixels) is produced. Subsequently in step 607, the raster data is converted into compressed data on the basis of the specification of the run-length data, moving to a step 608.

In step 608, it is decided whether processing is performed for the last line or not. When it is decided that processing is not completed, step 602 is performed. When it is decided that processing is completed, in step 609 production of compressed data is completed.

Thus produced compressed data 116 is input to a compressed data expansion unit 109 directly or through an external compressed data storage unit or transmission path. In the compressed data expansion unit 109, the compressed data 116 is converted into the raster data 117. Thus converted raster data 117 is input to a display device 110 and a polygon is displayed therein.

In this way, in accordance with a high definition graphic display apparatus according to the first embodiment, line scan lists of N lines which are directly convertible into run-length data are directly converted into run-length data by run-length compression. Therefore, it is not necessary to raster-expand every data of a polygon which has been expanded N times to produce raster data, resulting in saving memories required for data processing.

In the case of direct conversion of run-length data at production of compressed data in the compressed data producing unit, characteristics of run-length compression reduces cost for converting data representing each painted interval into run-length data. On the other hand, in the case of performing raster expansion, since the ratio of the directly inconvertible unit N lines to the entire data is small, speed of data processing is not significantly reduced. In addition, it is decided whether processing is switched to raster expansion or not only by comparing a plurality of values, so that it does not cause significant cost-up.

The scan line information extracting unit 107 predetects lines which are directly inconvertible into run-length data. Therefore, it is possible to decide lines which are directly inconvertible into run-length data with ease and simplify processing with no unnecessary retrieval, with no necessity of producing all line scan lists, resulting in high processing speed.

Furthermore, since compressed data is sequentially produced for each N lines of line scan lists which are sequentially output, memories for storing all line scan lists are unnecessary. Also, memories required for raster expansion of the unit N lines which are directly inconvertible into run-length data are for the unit N lines at most, resulting in fewer memories required for producing compressed data.

Furthermore, as concerns line scan lists, information of each painted interval is represented by X coordinates of a starting point and an end point of the painted interval and the information is limited to the coordinate value of X coordinate, resulting in much fewer memories and higher processing speed and transmission speed.

Furthermore, the compressed data 116 is input to the compressed data expansion unit 109 directly or through an external data storage unit or transmission path and converted into the raster data 117 to be displayed therein. Therefore, data to be transmitted or to be stored is less than conventional raster data, resulting in higher communication speed of data and fewer memories for storing the data.

What is claimed:

1. A high definition graphic display apparatus comprising:

a polygon data inputting unit for producing polygon data which includes coordinates of vertexes of a polygon to be displayed;

an N times coordinate conversion unit for expanding each coordinate value of the polygon data N times and outputting N times polygon data;

an active list producing unit for producing an active list which includes a plurality of active cells each including information of an X coordinate for a top of a side of a polygon which has N-times expanded coordinate values and is represented by the N times polygon data, inclination of the side, and a number of Y coordinate lines which intersect the side, for each Y coordinate line positioned at top end of the side;

a scan list producing unit for producing a scan list by finding a line scan list for every scan line with a point on a side corresponding to the active cell which is present on the scan line sequentially arranged in a direction of the scan line, for each scan line as a Y coordinate scan line using the active list;

a scan line information extracting unit for deciding whether an unit N lines is directly convertible into compressed display data or not, the unit N lines including a Y coordinate line including N lines of a plurality of line scan lists included in the scan list, in the process of producing the active list;

a compressed data producing unit for producing compressed display data in accordance with an output of the scan line information extracting unit for each unit N lines;

a compressed data expansion unit for expanding the compressed display data to produce raster data;

a display device for displaying the expanded raster data; wherein the line scan lists are directly convertible by run-length compression.

2. The high definition graphic display apparatus as defined in claim 1 wherein, the compressed data producing unit includes unit for producing run-length data in which a concentration of each cell on the unit N lines is described on the basis of a specification of the run-length compression and which includes N×N coordinates on the unit N lines, from line scan lists of the unit N lines, and for the unit N lines of the line scan lists which are directly inconvertible by run-length compression, includes unit for producing raster data in the concentration of each cell on the unit N lines which includes N×N coordinates on the unit N lines from line scan lists of the unit N lines, and for converting the raster data into run-length data on the basis of the specification of the run-length compression to produce run-length data of the unit N lines.

3. A high definition graphic display apparatus comprising:

a polygon data inputting unit for producing polygon data which includes coordinates of vertexes of a polygon to be displayed;

an N times coordinate conversion unit for expanding each coordinate value of the polygon data N times and outputting N times polygon data;

an active list producing unit for producing an active list which includes a plurality of active cells each including information of an X coordinate for a top of a side of a polygon which has N-times expanded coordinate values and is represented by the N times polygon data, inclination of the side, and a number of Y coordinate lines which intersect the side, for each Y coordinate line positioned at top end of the side;

a scan list producing unit for producing a scan list by finding a line scan list for every scan line with a point on a side corresponding to the active cell which is present on the scan line sequentially arranged in a direction of the scan line, for each scan line as a Y coordinate scan line using the active list;

a scan line information extracting unit for deciding whether an unit N lines is directly convertible into compressed display data or not, the unit N lines including a Y coordinate line including N lines of a plurality of line scan lists included in the scan list, in the process of producing the active list;

a compressed data producing unit for producing compressed display data in accordance with an output of the scan line information extracting unit for each unit N lines;

wherein the N times coordinate conversion unit expands 4 times.

4. A high definition graphic display apparatus comprising:

a polygon data inputting unit for producing polygon data which includes coordinates of vertexes of a polygon to be displayed;

an N times coordinate conversion unit for expanding each coordinate value of the polygon data N times and outputting N times polygon data;

an active list producing unit for producing an active list which includes a plurality of active cells each including information of an X coordinate for a top of a side of a polygon which has N-times expanded coordinate values and is represented by the N times polygon data, inclination of the side, and a number of Y coordinate lines which intersect the side, for each Y coordinate line positioned at top end of the side;

a scan list producing unit for producing a scan list by finding a line scan list for every scan line with a point on a side corresponding to the active cell which is present on the scan line sequentially arranged in a direction of the scan line, for each scan line as a Y coordinate scan line using the active list;

a scan line information extracting unit for deciding whether an unit N lines is directly convertible into compressed display data or not, the unit N lines including a Y coordinate line including N lines of a plurality of line scan lists included in the scan list, in the process of producing the active list;

a compressed data producing unit for producing compressed display data in accordance with an output of the scan line information extracting unit for each unit N lines;

wherein plural pieces of the produced frame compression display data is stored in the compressed data storage unit and the plural pieces of the frame compressed data is sequentially input to the compressed data expansion unit to be sequentially displayed by the display device; and wherein the compressed display data is stored and displayed for each frame.

* * * * *